United States Patent [19]

Howland

[11] Patent Number: 4,695,952
[45] Date of Patent: Sep. 22, 1987

[54] DUAL REDUNDANT BUS INTERFACE CIRCUIT ARCHITECTURE

[75] Inventor: Gary R. Howland, Granby, Conn.

[73] Assignee: United Technologies Corporation, Hartford, Conn.

[21] Appl. No.: 635,944

[22] Filed: Jul. 30, 1984

[51] Int. Cl.$^4$ .............................................. G06F 13/40
[52] U.S. Cl. .................................................... 364/200
[58] Field of Search ....................... 364/200 MS File

[56] References Cited

U.S. PATENT DOCUMENTS

| | | | |
|---|---|---|---|
| 4,001,783 | 1/1977 | Monahan et al. | 364/200 |
| 4,409,656 | 10/1983 | Andersen et al. | 364/200 |
| 4,486,826 | 12/1984 | Wolff et al. | 364/200 |
| 4,490,785 | 12/1984 | Strecker et al. | 364/200 |

Primary Examiner—Thomas M. Heckler
Attorney, Agent, or Firm—Francis J. Maguire, Jr.

[57] ABSTRACT

An asynchronous bus interface circuit manages the transfer of messages between a host processor memory, and one of two redundant serial data buses by separately processing command words thereby permitting efficient handling of status and data words.

10 Claims, 12 Drawing Figures

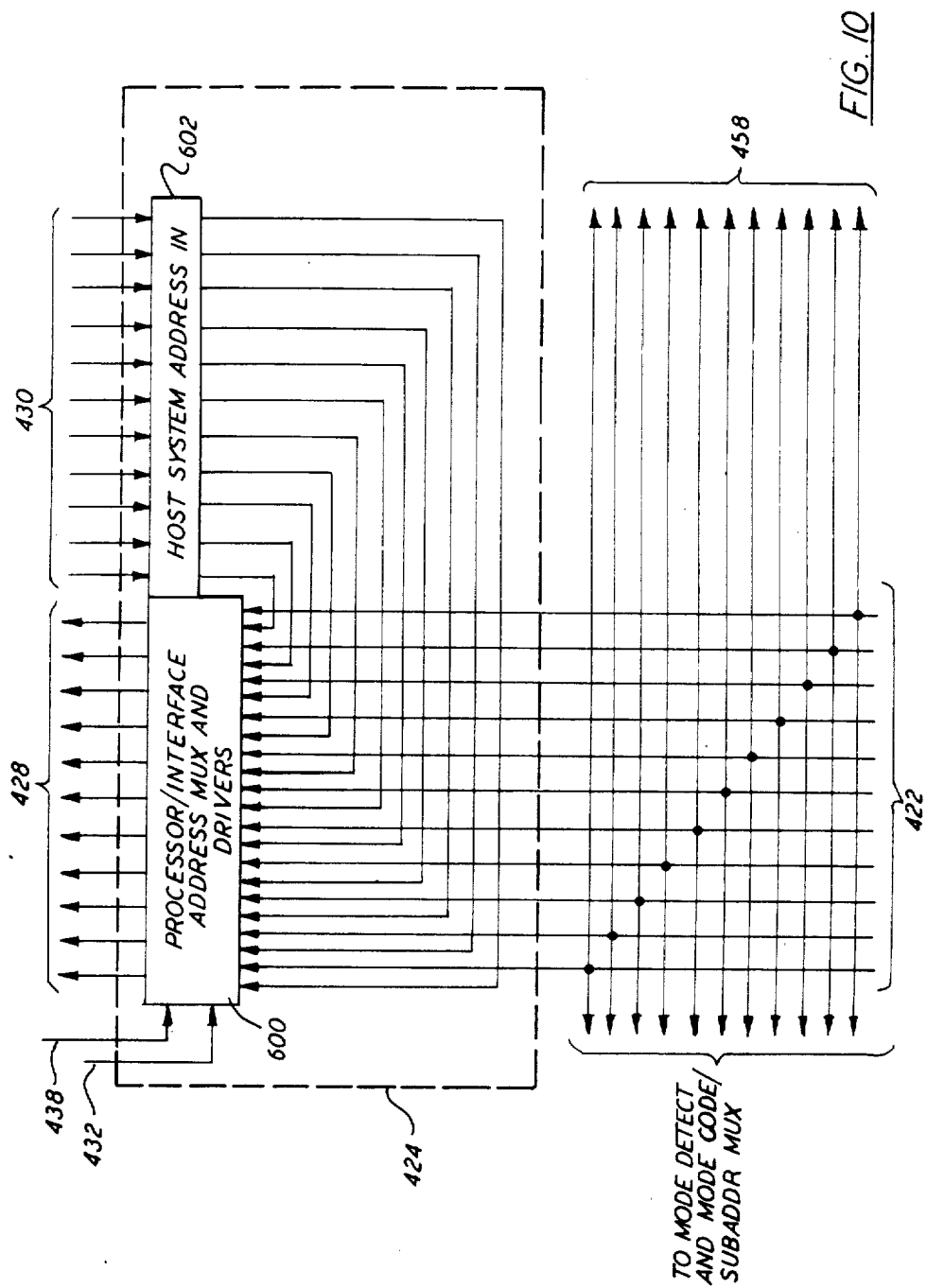

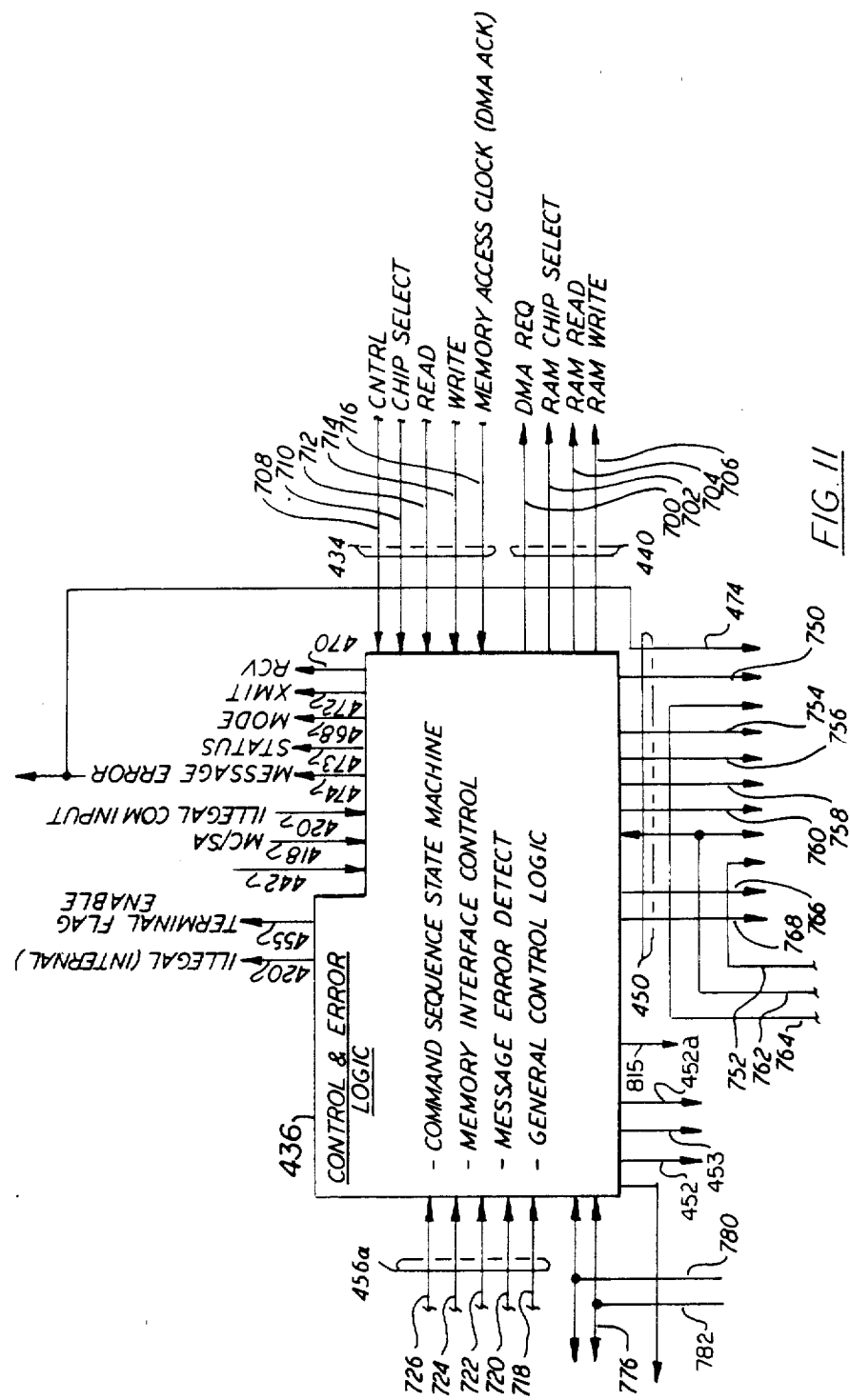

DUAL REDUNDANT BUS INTERFACE CIRCUIT ARCHITECTURE

TECHNICAL FIELD

This invention relates to the architecture of circuitry for interfacing between a subsystem and a dual redundant data bus linking a bus controller, the interfaced subsystem, and a plurality of similarly interfaced subsystems.

BACKGROUND ART

The transmission of digital data between subsystems in an overall system in which the various subsystems are required to interact can present difficult interfacing problems. For example, in military aircraft systems the data bus will typically be used for communications between various subsystems manufactured by different vendors. In the absence of a defined communications protocol the different vendors would be free to choose any attractive standard established in the market place. In order to promote uniformity among its different vendors, the government promulgated a military standard, officially known as AIRCRAFT INTERNAL TIME DIVISION COMMAND/RESPONSE MULTIPLEX DATA BUS, MIL-STD-1553B to define the requirements for data bus techniques which are to be utilized in systems integration of military aircraft subsystems.

It is possible to devise interface circuitry that permits a vendor to interface with a MIL-STD-1553B bus without imposing excessive overhead on the subsystem itself. For example, U.S. Pat. No. 4,136,400, granted to Caswell et al., granted on Jan. 23, 1979 assigned to Rockwell International Corporation, discloses a microprogrammable data terminal for use as in an interface circuit in a MIL-STD-1555B system. The Caswell circuitry is usable as either as a bus controller or a terminal. (A remote terminal is a circuit that simply provides the interface between the bus and a subsystem. A bus controller is a circuit that serves the function of issuing instructions to the other subsystems and monitoring the bus to prevent improper communications.) A disadvantage of the Caswell device is that it is not capable of interfacing with a redundant bus. It is also disadvantageous in situations in which the bus controller function is not required. Moreover, the Caswell device achieves only limited functional capability with the hardware employed.

Other manufacturers have disclosed architectures which perform the complete MIL-STD-1553B protocol function. For example, Circuit Technology Inc. (CTI) of Farmingdale, N.Y. has disclosed a circuit that uses five LSI chips to perform remote terminal, passive monitor or bus controller functions for a dual redundant system. However, the CTI device requires a large number of logic gates to achieve a limited functional capability. The chip's capabilities are limited to message verification, word count, status word generation, storage of current and last commands, the broadcast option, and mode code handling.

An architecture which reduces the number of logic gates required to achieve a high degree of functionality while at the same time relieving the host subsystem overhead to a very large degree is needed.

DISCLOSURE OF INVENTION

The object of the present invention is to provide circuit architecture for a remote terminal interface circuit that interfaces with a dual redundant serial data bus with a minimum number of logic gates to achieve very high functional capability.

According to the present invention a dual redundant bus interface circuit minimizes the amount of redundant circuitry required to maintain redundant communication channels by optimizing the data paths and control points, and by the use of host system memory to store special function information. Dual Manchester decoders are associated with dedicated command registers for converting command words from serial to parallel form. By segregating the command recognition logic in this manner, data and status words from the decoders are handled separately in a uniquely designed transfer circuit that utilizes a receive/transmit shift register to receive serial data inputs for transmittal through a data word command word multiplexer to the subsystem and to receive data words in parallel form from the subsystem or internally generated status words in parallel form for transmittal in serial form to the serial data bus.

In further accord with the present invention, imbedded memory management consisting of the memory address control and host system control hand shaking logic provides reduced host system hardware and software requirements, reduces the number of failure modes, and provides flexibility of use with at least two distinct means for memory interfacing, i.e., dedicated processor or DMA implementation or transparent dual port memory implementation.

In still further accord with the present invention, the circuit takes advantage of the similarities between the "command" and "status" words of the communication network to provide a self-test capability with a greater degree of test coverage over previous techniques. This technique is to cause a status word to be transmitted and directed to the circuit inputs rather than the network ports. This status word is then perceived by the command recognition logic to be a command, causing known and easily checkable actions to occur.

In still further accord with the present invention, the circuit architecture provides the means via logic outputs and inputs to implement application dependent special functions and/or illegal command definition. In this way, system adaptability is enhanced.

These and other objects, features and advantages of the present invention will become more apparent in light of the detailed description of a best mode embodiment thereof, as illustrated in the accompanying drawing.

BRIEF DESCRIPTION OF THE DRAWING

FIG. 10 is a more detailed simolified schematic block diagram of the memory address control logic of FIG. 8;

FIG. 11 is a more detailed simplified schematic block diagram of the control and error logic of FIG. 8.

BEST MODE FOR CARRYING OUT THE INVENTION

Figure 1:
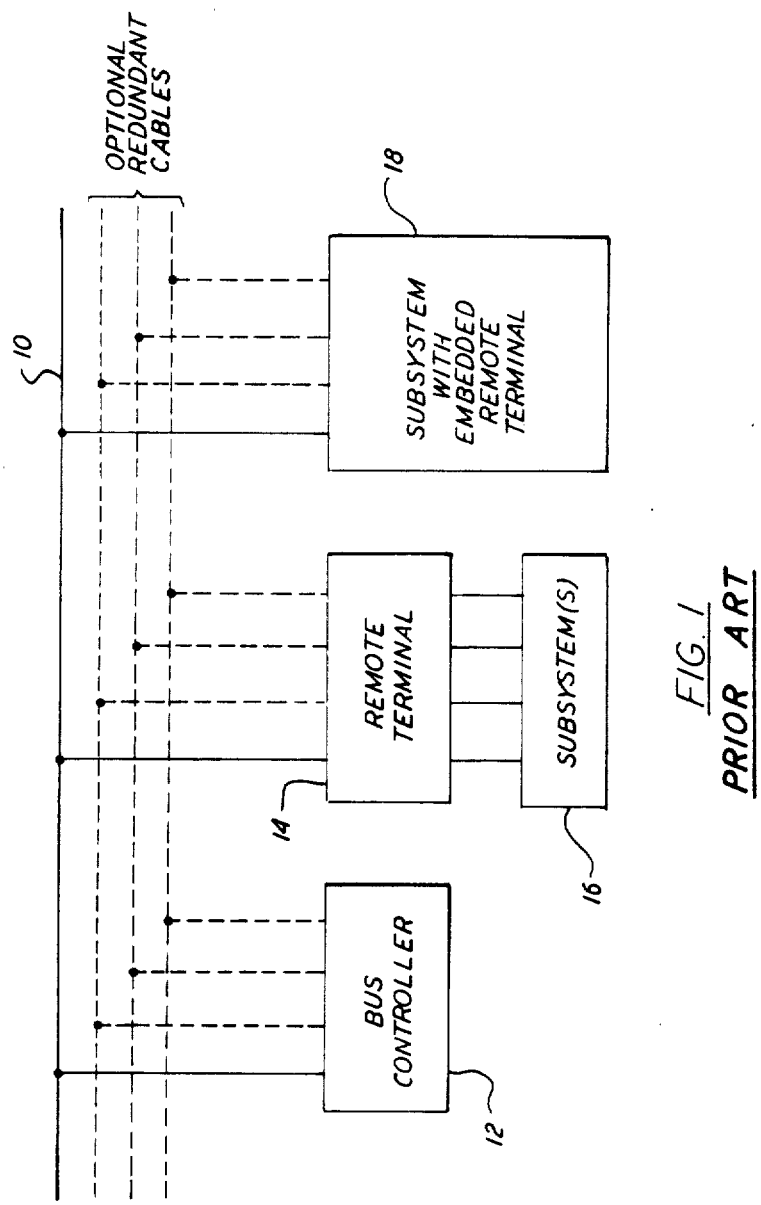
FIG. 1 is an illustration of a sample multiplex data bus architecture from MIL-STD-1553B.

MIL-STD-1553B encompasses the data bus line 10 and its interface electronics illustrated in FIG. 1, and also defines the concept of operation and information flow on the multiplex data bus and the electrical and functional formats to be employed. FIG. 1 shows a bus controller 12 which is the terminal assigned the task of initiating information transfers on the data bus 10. A remote terminal (RT) 14 includes all terminals not operating as the bus controller or as a bus monitor. A bus monitor (not shown) is the terminal assigned the task of receiving bus traffic and extracting selected information to be used at a later time. A subsystem 16, which may include a number of subsystems, is a device or functional unit receiving data transfer service from the data bus. A subsystem with an embedded remote terminal 18 is also illustrated.

The military standard contemplates the use of more than one data bus to provide more than one data path between the subsystems, i.e., dual redundant data bus, tri-redundant data bus, etc. Therefore, FIG. 1 illustrates optional redundant cables as dotted lines which illustrate the possible redundancy implementations. In such implementations each separate data bus would employ all the hardware including twisted shielded pair cables, isolation resistors, transformers, etc., required to provide a plurality of independent data paths between the bus controller and all the associated remote terminals.

Figure 2:
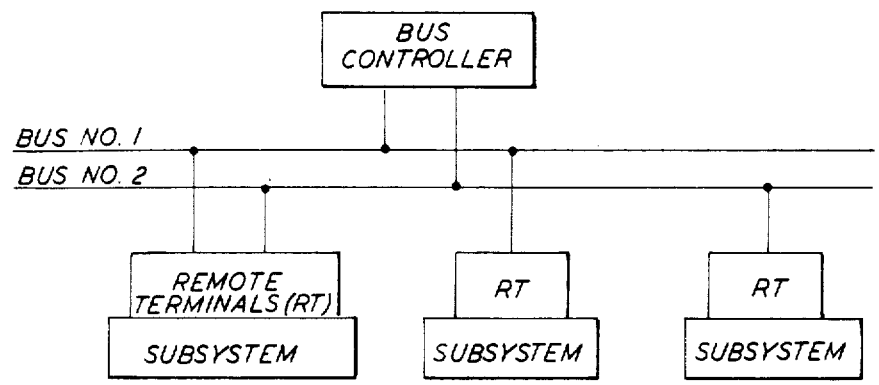
FIG. 2 is an illustration of a system having dual redundant buses as illustrated in MIL-STD-1553B.
Figure 3:
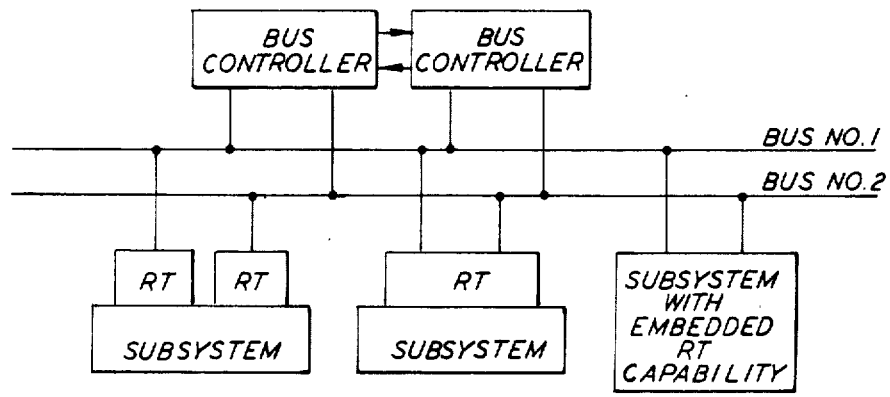
FIG. 3 is an illustration of another dual redundant system having a pair of bus controllers from MIL-STD-1553B.

In particular, it has been found, through application experience in various aircraft, that the use of a dual standby redundancy technique is very desirable for use in integrating missions avionics. FIGS. 2 and 3 illustrate some possible approaches to dual redundancy. These illustrations are not intended to be inclusive, but rather representative.

MIL-STD-1553 dictates that the multiplex data bus system shall function asychronously in a command/response mode, and transmission shall occur in a half-duplex manner. Asychronous operation is the use of an independent clock source in each terminal for message transmission. Decoding is achieved in receiving terminals using clock information derived from the message. Operation of a data transfer system in either direction over a single line, but not in both directions on that line simultaneously is characterized as half-duplex transmission. Sole control of information transmission on the bus shall, according to the standard, reside with the bus controller 12 of FIG. 1, which shall initiate all transmissions. The information flow on the data bus shall be comprised of messages which are, in turn, formed by three types of words (command, data, and status) as defined below.

Figure 4:
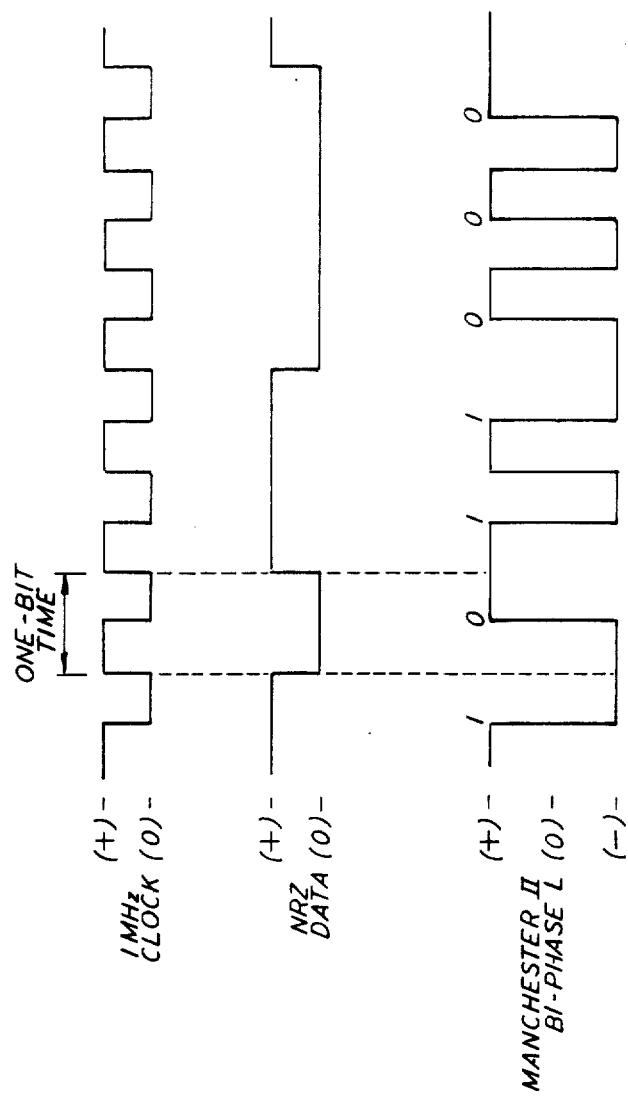
FIG. 4 is an illustration of data and coding according to MIL-STD-1553.
Figure 5:
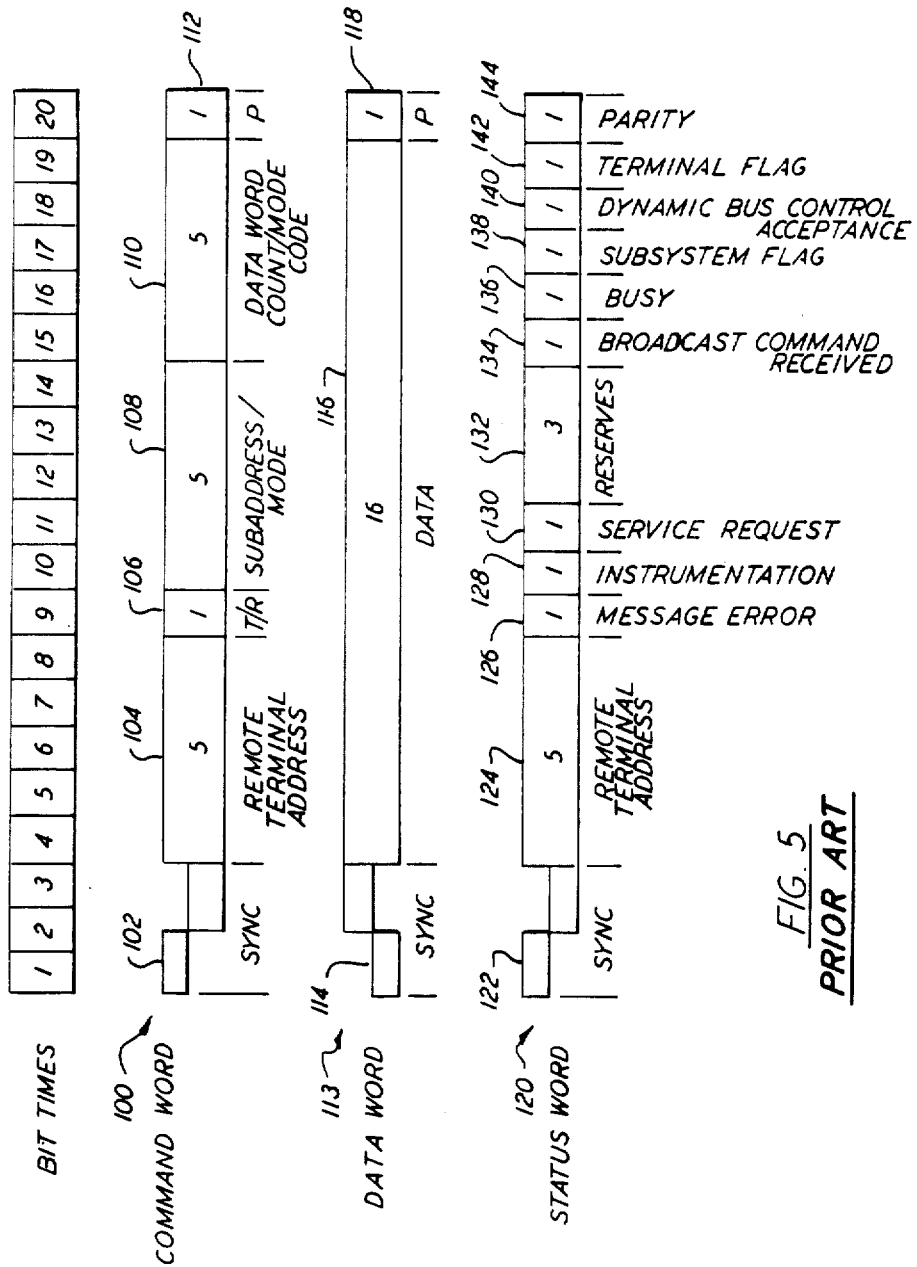
FIG. 5 is an illustration of word formats according to MIL-STD-1553B.

The signal shall, according to the standard, be transferred over the data bus in serial digitial pulse code modulation (PCM) form. PCM is the form of modulation in which the modulation signal is sampled, quantized, and coded so that each element of information consists of different types or numbers of pulses or spaces. The data code shall be Manchester II bi-phase level. A logic one shall be transmitted as a bipolar coded signal 1/0 (i.e., a positive pulse followed by a negative pulse). A logic 0 shall be a bipolar coded signal 0/1 (i.e., a negative pulse followed by a positive pulse). A transistion through 0 occurs at the new point of each bit time (see FIG. 4). The transmission bit rate on the bus shall be 1.0 megabit per second. The word size shall be 16 bits plus the sync wave form and the parity bit for a total of 20 bit times as shown in FIG. 5. The word formats shall be as shown in FIG. 5 for the command, data, and status words.

Referring particularly to FIG. 5, the command word 100 shall be comprised of a sync waveform 102, remote terminal address field 104, transmit/receive (T/R) bit 106, subaddress/mode field 108, word count/mode code field 110, and a parity (P) bit 112. The command sync wave form 102 shall be an invalid Manchester wave form as shown in FIG. 5. The width shall be three bit times, with the sync wave form being positive for the first one and one-half bit times, and then negative for the following one and one-half bit times. The next five bits following the synch shall be the RT address. Each RT shall be assigned a unique address. The next bit following the remote terminal address shall be the T/R bit, which indicates the action required of the RT. A logic 0 shall indicate that the RT is to receive, and a logic 1 shall indicate that the RT is to transmit. The next five bits follwing the R/T bit shall be utilized to indicate an RT subaddress for use of a mode control, as is dictated by the individual terminal requirements. The next five bits following the subaddress/mode field shall be the quantity of data words to be either sent out or received by the RT or the optional mode code as specified below. A maximum of 32 data words may be transmitted or received in any one message block. All 1's shall indicate a decimal count of 31 and all 0's shall indicate a decimal count of 32. A subaddress/mode code of 00000 or 11111 shall imply that the contents of the data word count/mode code field are to be decoded as a five bit mode command. The mode code shall only be used to communicate with the miltiplex bus related hardware, and to assist in the management of information flow, and not to extract data from or feed data to a functional subsystem. The last bit in the word shall be used for parity over the preceding 16 bits. Odd parity shall be utilized.

The standard defines a data word as made up of a sync wave form, data bits, and a parity bit (see FIG. 5). The data sync wave form 114 shall be an invalid Manchester wave form as shown in FIG. 5. The width shall be three bit times, with the wave form being negative for the first 1 and ½ bit times, and then positive for the following 1 and ½ bits times. The sixteen bits 116 following the sync shall be utilized for data transmission. The last bit 118 shall be utilized for parity.

The standard defines a status word 120 as made up of a sync wave form 122, RT address 124, message error bit 126, instrumentation bit 128, service request bit 130, three reserved bits 132, braodcast command received bit 134, busy bit 136, subsytem flag bit 138, dynamic bus control acceptance bit 140, terminal flag bit 142, and a parity bit 144. A status word is normally sent from an RT to a controller following the reception of a command or a block of data words.

The status sync wave form is the same as the command word with sync wave form. The five bits following the sync wave form shall contain the address of the RT which is transmitting the status word. The status word bits 126-142 at bit times 9-19 are utilized for various functions as shown in FIG. 5 and which are more fully described in MIL-STD-1553B which is hereby incorporated by reference. The last sigificant bit in the status word is utilized for parity as in the command 100 and data 113 words.

According to the standard, the messages transmitted on the data bus shall be in accordance with the formats shown in FIG. 6 and FIG. 7, and as described below:

(a) bus controller to remote terminal transfers. The bus controller issues a receive command 200 followed by the specified number of data words 202. The RT, after message validation, transmits a status word 204 back to the controller. The command and data words are transmitted in a contiguous fashion with no interword gaps. The maximum and minimum response time 206 permitted is specified in the standard.

(b) remote terminal to bus controller transfers. The bus controller issues a transmit command 208 to the RT. The RT, after command word validation during a response time 208, transmits a status word 210 back to the bus controller, followed by the specified number of data words 212. The status 210 and data 212 words are transmitted contiguously with no interword gaps.

(c) remote terminal to remote terminal transfers. The bus controller issues a receive command 214 to RT A followed contiguously to a transmit command 216 to RT B. RT B, after command validation during a response time 210, transmits a status word 212 followed by the specified number of data words 214. The status 212 and data 214 words are transmitted in a contiguous fashion with no gap. At the conclusion of the data transmission by RT B, RT A shall transmit a status word 222 within the specified time period 224.

(d) mode command without data word. The bus controller issued a transmit command 226 to the RT using a mode code specified in the standard. The RT transmits a status word 228 after command word validation. The response time 230 is indicated.

(e) mode command with data word (transmit). The bus controller issues a transmit command 232 to the RT using a mode code specified in the standard. The RT transmits a status word 234 followed by one data word 236 after command word validation. The status 234 and data 236 words are transmitted in a contiguous fashion with no gap.

(f) mode command with data word (received). The bus controller issues a receive command 238 to the RT using a mode code specified in the standard, followed by one data word 240. The command 238 and data 240 words are transmitted in a contiguous fashion with no gap. The RT, after command and data word validation, transmits a status word 242 back to the controller.

An intermessage gap 244 exists between messages. Each of the intermessage gaps may be followed by a new command word 246 which is shown as the "next" command word in FIG. 6.

The various message formats permitted to be transmitted on the data bus, according to the standard, are continued in FIG. 7, as described below:

(a) bus controller to remote terminal(s) transfer (broadcast). The bus controller issues a receive command word 300 with 11111 in the RT address field followed by the specified number of data words 302. The command word 300 and data words 302 are transmitted in a contiguous fashion with no gap. The RT(s) with the broadcast option set the broadcast command received bit in the status word and do not transmit the status word. Broadcast is operation of the data bus system such that information transmitted by the bus controller or a remote terminal is addressed to more than one of the remote terminals connected to the data bus.

(b) remote terminal to remote terminal(s) transfers (broadcast). The bus controller issues a receive command word 304 with 11111 in the RT address field followed by a transmit command 306 to RT A using the RT's address. RT A transmits a status word 308 followed by the specified number of data words 310 after command word validation during a response time 312. The status 308 and data 310 words are transmitted in a contiguous fashion with no gap. The RT(s) with the broadcast option, excluding RT A, shall, after message validation, set the broadcast receive bit in the status word as specified in the standard and shall not transmit the status word.

(c) mode command without data word (broadcast). The bus controller issues a transmit command word 314 with 11111 in the RT address field, and a mode code specified in the standard. The RT(s) with the broadcast option set the broadcast received bit in the status word and do not transmit the status word.

(d) mode command with data word (broadcast). The bus controller issues a receive command word 316 with 11111 in the RT address field and a mode code specified in the standard, followed by one data word 318. The command word and data word are transmitted in a contiguous fashion with no gap. The RT(s) with the broadcast option shall after message validation, set the broadcast received bit in the status word and shall not transmit the status word.

Figure 6:
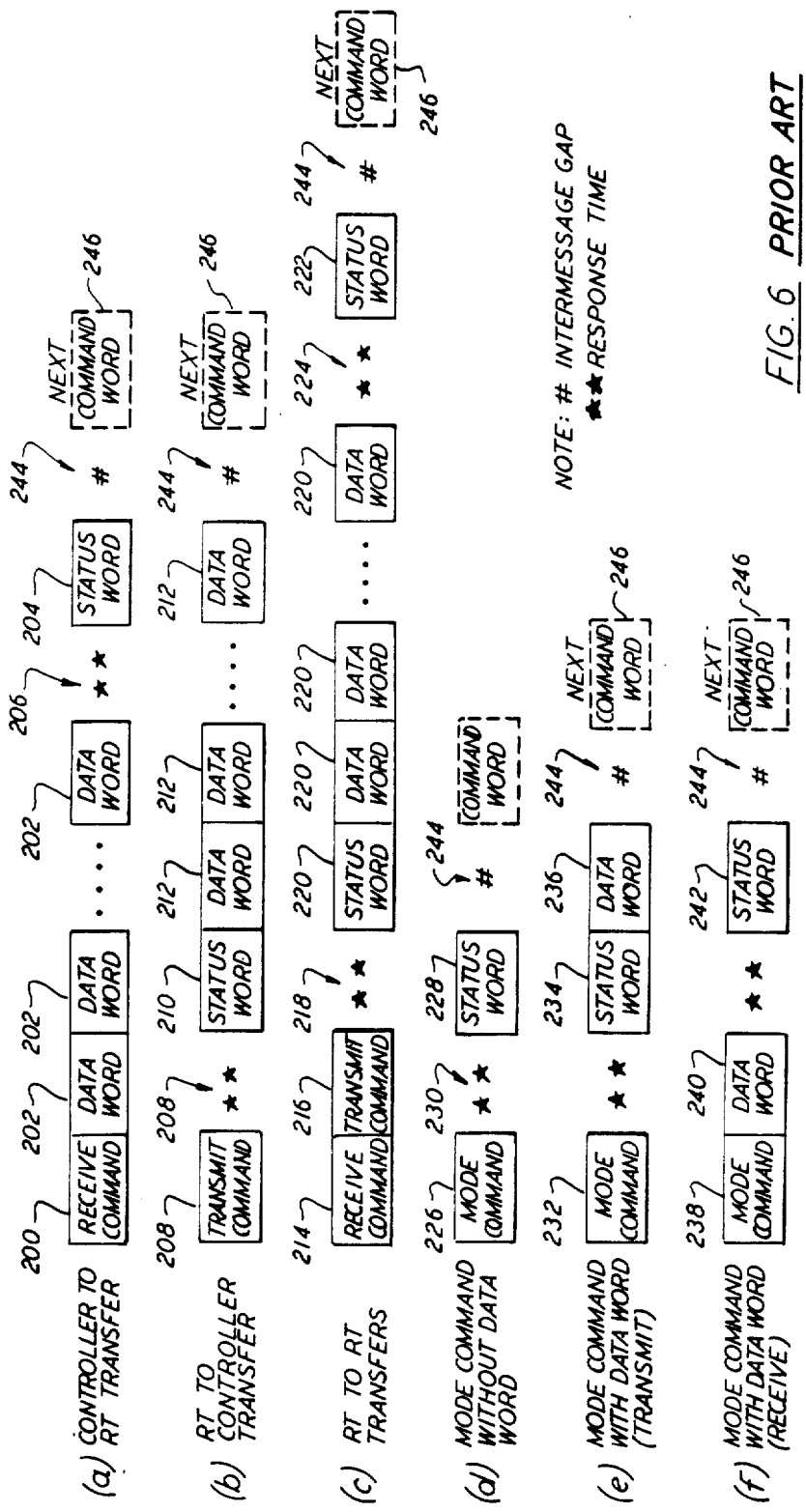
FIG. 6 is an illustration of information transfer formats according to MIL-STD-1553B.
Figure 7:
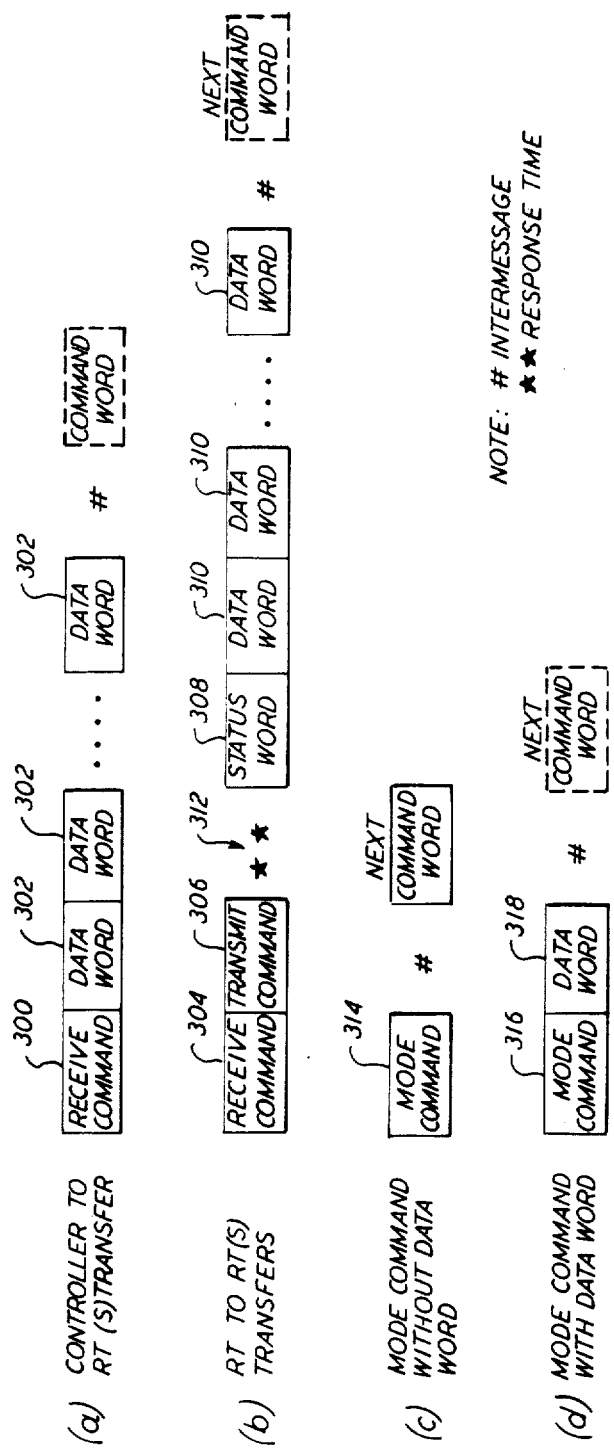
FIG. 7 is an illustration of broadcast information transfer formats according to MIL-STD-1553B.

The bus controller provides a minimum gap time of 4 microseconds between messages as shown in FIG. 6 and FIG. 7. This time period is measured from the mid-zero crossing of the last bit of the preceding message to mid-zero crossing of the next command word sync. The RT response, in accordance with the standard, to a valid command word is within the time period of 4 to 12 microseconds. This time period is measured from the mid bit-zero crossing of the last word to the mid-zero crossing of the status word sync. The minimum time that a terminal shall wait before considering that a response has not occurred shall be 14 microseconds. The time is measured from the mid bit zero crossing of the last bit of the word to the mid zero crossing of the expected status word sync.

Terminals are required by the standard to have common operating capabilities as specified in the following paragraphs:

(a) The terminal shall ensure that each word conforms to the following minimum criteria:
  (i) the word begins with a valid sync field;
  (ii) the bits are in a valid Manchester two code;
  (iii) the information field has 16 bits plus parity; and
  (iv) the word parity is odd.

When a word fails to conform to the preceding criteria, the word shall be considered invalid.

(b) The terminal shall verify that the message is contiguous. Improperly timed data sync shall be considered a message error.

(c) The terminal shall contain a hardware implemented time-out to preclude a signal transmission of greater than 800 microseconds. This hardware does not preclude a correct transmission in response to a command. Reset of this time-out function is performed by the reception of a valid command on the bus on which the time-out has occurred.

(d) A terminal operating as a bus controller is responsible for sending data bus commands, participating in data transfers, receiving status responses, and monitoring system status as defined in the standard. The bus controller function may be embodied as either a stand-alone terminal, whose sole function is to control the data bus(es) or contained within a subsystem. Only one terminal shall be in active control of a data bus at any one time.

A remote terminal (RT) operates in response to valid commands received from the bus controller. The RT shall accept a command word as valid when the command word meets the criteria of the standard, and the command word contains a terminal address which matches the RT address or an address of 11111, if the RT has the broadcast option. The RT shall be capable of receiving a command word on the data bus after the minimum intermessage gap time has been exceeded, when the RT is not in the time period of 4 to 12 microseconds, prior to the transmission of a status word and when it is not transmitting on that data bus. A second valid command word sent to an RT shall take precedence over the previous command. The RT shall respond to the second valid command. A remote terminal does not respond to a command word which fails to meet the standard's criteria. The remote terminal responds with a status word when a valid command word and the proper number of contiguous valid data words are received, or a single valid word associated with a mode code is received. Any data word(s) associated with a valid receive command does not meet the criteria of the standard or an error in the data word count shall cause the remote terminal to set the message error bit in the status word to a logic one and suppress the transmission of the status word. If a message error has occured, then the entire message shall be considered invalid.

Figure 8:
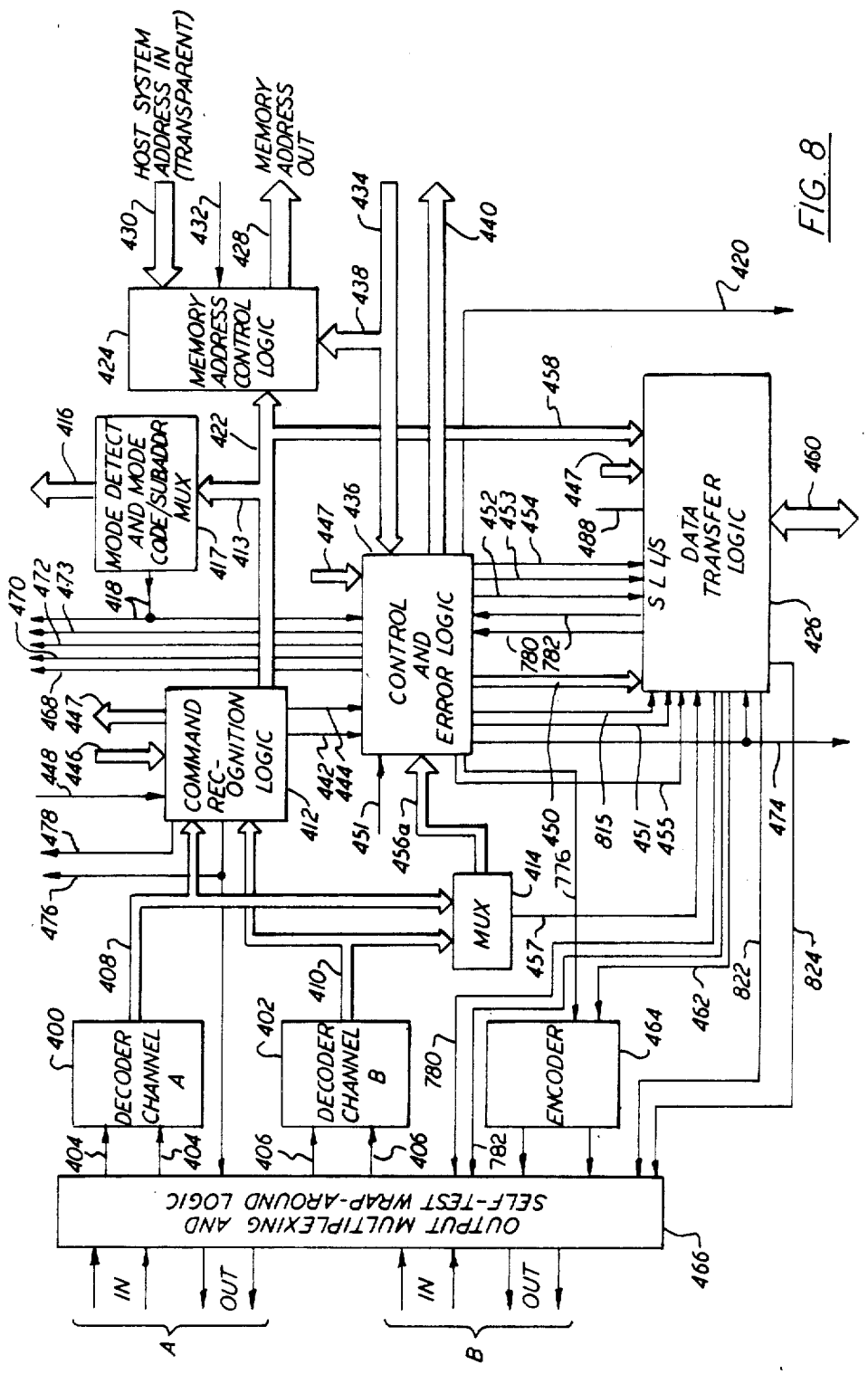
FIG. 8 is a simplified block diagram illustration of the remote terminal interface circuitry architecture according to the present invention.

FIG. 8 illustrates an architecture block diagram for an interface circuit according to the present invention. The circuit architecture is suitable for implementing in a digital integrated circuit and interfaced between a host digital processor system and a redundant multiplex communication network. Although the invention may be practiced in any multiplex communication network (not necessarily redundant) the following best mode description will be restricted to the MIL-STD-1553B dual redundant implementation. It should be understood, however, that the invention is not necessarily restricted thereto.

Two Manchester decoders 400, 402 each receive bi-phase Manchester data on the lines 404, 406, rspectively. Each decoder decodes each received word's sync and data bits, and verifies proper sync, Manchester, and parity for all words. Proper frequency and edge skew are also verified. Each decoder 400, 402 provides NRZ output signals on lines 408, 410 which are provided to command recognition logic 412 and a multiplexer 414.

The command recognition logic 412 monitors the output of both decoders at all times. Recognition of a valid command causes a reset of present interface activity and proper execution of the latest command is begun. This maintains all requirements for acceptance of superceding valid commands. Command output lines 413 are provided to a mode detect and mode code/subaddress multiplexer 417. Output lines 416 carry mode code/subaddress output lines which contain the five least significant bits of the most recent command (the mode code) or they contain the subaddress. A signal on a line 418 identifies if the lines 416 contain mode code or subaddress information.

The signals on the lines 416, 418 are provided to external digital logic where they are used to allow the subsystem to detect application specific illegal commands or to implement application specific special functions. An illegal command signal on a line 420 from the host logic is provided to the interface to identify the presence of an illegal command. Line 420 is also used to transmit the internal detection of illegal commands.

The command word is transferred on lines 422 to memory address control logic 424 and data transfer logic 426. The memory address control logic 424 controls the output of the address lines during memory access. In direct memory access (DMA) system implementations, the memory address control logic provides interface generated addresses on lines 428 during a DMA acknowledge as well as tristate capability. In transparent dual-port memory implementations, the memory address control logic 424 provides either an interface generated or host system generated address (received on lines 430 and rerouted out) to RAM on lines 428. An address out enable signal on a line 432 from the host causes the memory address output lines 428 to be active when a signal on the line 432 is low and causes the lines 428 to tristate when the signal on the line 432 is high. This permits the host to select between interface and other address sources (in DMA configuration).

Control input signals from the host system are received on lines 434 by control and error logic 436. One or more of these signals are also received on lines 438 by the memory address control logic 424. The control and error logic 436 also provides control signals to the host system on lines 440.

The control and error logic 436 provides four major functions. These are:

(a) interface control for proper processing of 1553 commands;

(b) significant error check of 1553 data and operation;

(c) memory control (DMA or transparent) for proper data transfer; and (d) operation status and control hand shaking with host system.

The control and error logic receives new command activity signals on lines 442, 444. The signal on the line 442 resets present activity and the signal on the line 444 initiates new activity. The five bit terminal address input on lines 446 strobed into the command recognition logic 412 upon reception of a signal on a line 448 or during a control register load is illustrated.

The control and error logic 436 provides some status word bits on lines 450 to the data transfer logic 426. Additional control signals as described below are also provided to the data transfer logic 436.

During transmissions of data from memory to the 1553 bus:

(a) a load data signal on a line 451 for latching either a data word from memory or an incoming status word is provided;

(b) a select signal on a line 452 for selecting a data word or a status word to be loaded for transmittal is provided; and (c) a shift enable signal on a line 453 for enabling a shift of data to the 1553 bus is provided.

During reception of data from the 1553 bus for transmittal to the host:

(a) a shift enable signal on a line 454 for enabling a shift of serial data from the 1553 bus into the data transfer logic 436 is provided;

(b) a select signal on a line 455 for selecting a data word or a command word to be transmitted is provided; and (c) a load data signal on a line 456 for latching either a data word or a command word from the 1553 bus is provided.

The input signal MUX 414 provides decoded data and status words on lines 456a to the control and error logic 436 and serial data input to the Data Transfer Logic 426 on a line 457.

The data transfer logic 426 receives command words on lines 458 and transmits these commands, when required, to the host system via data bus lines 460. Data may be received on these same lines 460 by the data transfer logic 426 from the host system. The data is then transmitted out in serial form on a line 462 to an encoder 464. The data transfer logic 426 provides double buffered 16 bit parallel-to-serial and serial-to-parallel conversion during reception and transmission of message words.

The Manchester encoder 464 receives serial data from the data transfer logic 426, converts it to Manchester with proper sync and parity and passes it to the output and self test logic 466.

The output multiplexing and self testing logic 466 directs the output of the encoder 464 to one of four places: channel A or B or channel A or B decoders during self test.

A number of additional miscellaneous signals are provided to the host system as follows:

(a) A mode signal on a line 468 identifies that a mode command message transfer is in process by the interface. A receive command message signal 470 identifying that a receive message transfer is in process by the interface is shown emerging from the control and error logic 436. An additional signal on a line 472 identifies that a transmit command message transfer is in process by the interface. A status signal on a line 473 identifies to the subsystem that a status word is about to be transmitted. A message error signal on a line 474 is also provided from the control and error logic 436 to the host system (as well as the data transfer logic 426, as shown).

(b) An output signal on a line 476 from the command recognition logic 412 identifies which channel the most recent valid command has occurred on. A command strobe signal on a line 478 identifies receipt of a valid command.

Figure 9:
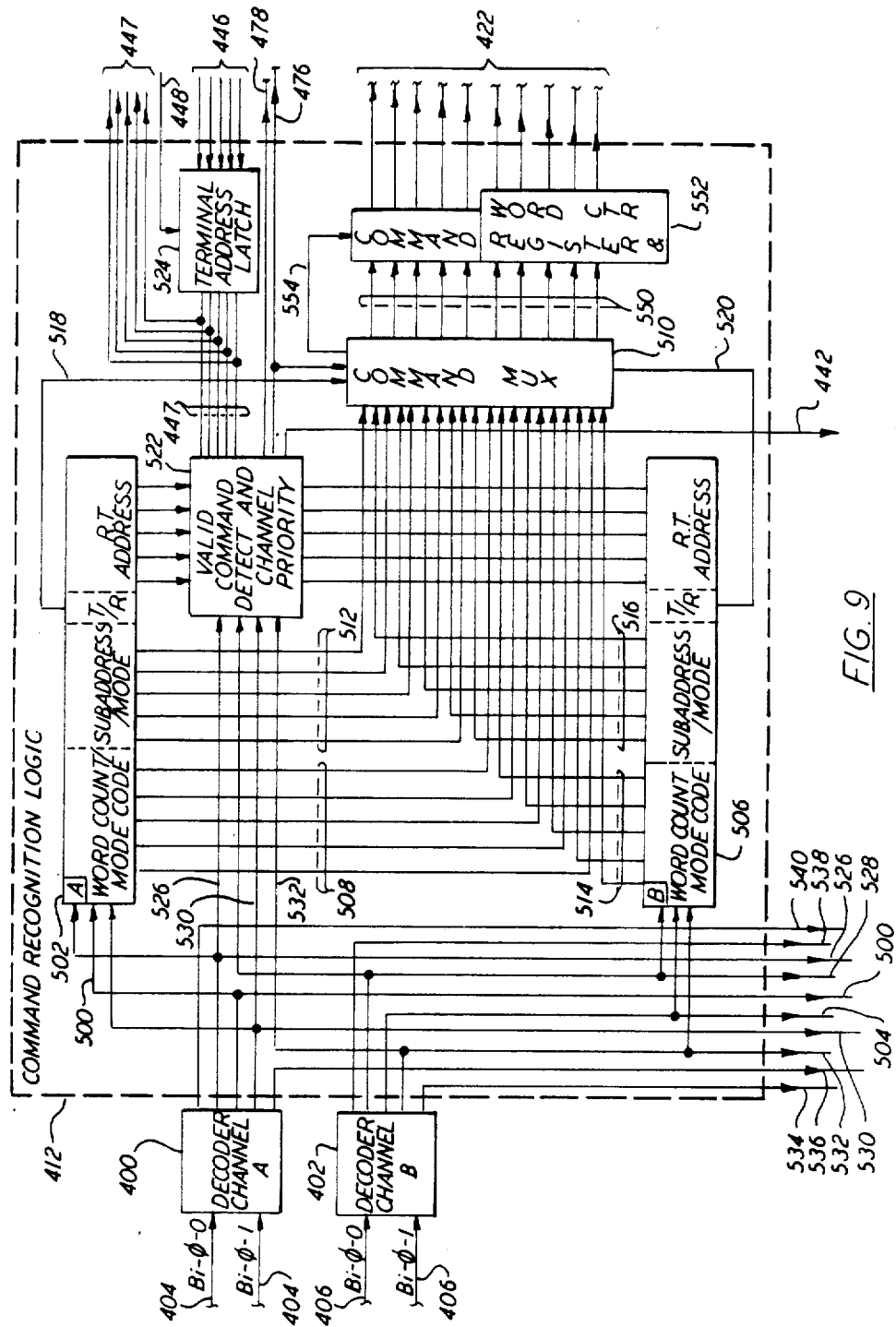
FIG. 9 is a more detailed simplified schematic block diagram of the command recognition logic of FIG. 8.

FIG. 9 is a more detailed illustration of the command recognition logic 412 of FIG. 8. Biphase Manchester code is received on the lines 404 by the decoder 400 for channel A. Serial NRZ data is transmitted on a line 500 to a channel A shift register 502 which receives each command word bit from the first through the twentieth bit until the entire serial word is held in the shift register in parallel form for transmission. Similarly, biphase Manchester code is received on the lines 406 by the channel B decoder 402. NRZ data on a line 504 is presented to a B channel shift register 506.

After a command word has been assembled in the shift register it is transmitted. Assuming the A channel is active, the word count/mode code bits are transmitted on lines 508 to command multiplexer 510. The subaddress/mode bits are also transmitted at the same time on lines 512 to the command multiplexer 510.

If the B channel has been selected, the A channel would be disabled and the word count/mode code bits from the B channel shift register 506 on lines 514 and the subaddress/mode bits on lins 516 would be transmitted instead. Similarly, the transmit/receive (T/R) bit from the active channel is transmitted on a line 518 or a line 520 to the command multiplexer 510, depending on which channel is active.

The remaining five bits of the assembled command word in the shift register 502 or the shift register 506 is transmitted to a Valid Command Detect and Channel Priority circuit 522. The R.T. Address bits in the command word are therein compared to the actual remote terminal address of the particular terminal. The remote terminal's actual address is strobed into the valid command and detect circuit 522 on the lines 447 from a terminal address latch 524. The terminal address latch 524 receives the remote terminal's actual address on the lines 446 (see FIG. 8). The actual address signals on the lines 446 are latched and strobed by a strobe signal on the line 448. When the Valid Command logic 522 determines a valid command with proper address has been received the command mux 510 is provided a signal on the line 476 and selects either channel A or B information to be transmitted to the command register 552.

Both of the shift registers 502, 506 and the Valid Command Detect and Channel Priority circuit 522 receive command sync signals on lines 526, 528 and valid word signals on lines 530, 532 from the respective channels. These signals are used by the shift registers to determine when to shift. The Valid Command Detect and channel priority circuitry 522 uses the command sync and valid word signals to determine that a new command has been received and its validity or lack thereof.

Each decoder 400, 402 provides a take data signal, respectively, on lines 534, 536 which indicate that new word information is available. The take data signals are also used to control shiftings and to assist the Control and Error Logic 436 (via lines 408, 410 and 456a of FIG. 8) in determining when new words are arriving and when they are completely assembled. Each decoder also provides an encoder shift clock signal on lines 538, 540 which are used to shift the NRZ data into a shift register at the proper time.

After multiplexing, the command word is transmitted on lines 550 to a Command Register and word counter 552. The command register includes a word counter which "down-counts" in order to keep track of the number of words identified in the word count bits of the command word. The transmit/receive (T/R) bit 518 or 520 is transmitted also on a line 554. The command register and word counter provides the command word (except for the RT Address) on the lines 422.

FIG. 10 is a more detailed drawing of the Memory Address Control Logic 424 of FIG. 8. Command words (with the exception of the five most significant bits, i.e., the RT Address) are transmitted on the lines 422 to a Processor/Interface Address Multiplexer and Drivers Circuit 600. The output of the Processor/Interface on lines 428 provides address information during memory access. In DMA system implementations, the memory address control 424 is to provide an interface generated address during a DMA acknowledge with tristate capability. The tristate enable signal on the line 432 enables the tristate. In transparent dual-port memory implementations, the Processor/Interface 600 multiplexes either interface generated or a host system address input at address input circuitry 602 on the lines 430.

In FIG. 11 the control and error logic 436 of FIG. 8 is illustrated in greater detail. Functions performed by this circuitry include a command sequence state machine for interface control and proper processing of 1553 commands, memory interface control (DMA or transparent) for proper data transfer, message error detection of 1553 data and operation, and general control logic for controlling operation status and control handshaking with the host system. The control output signals include a DMA REQ (direct memory access request signal) on a line 700 having an active high output when interface access of memory in DMA configured systems is requested. This signal is used by the host system processor to arbitrate and allow memory access by the interface. A RAM CHIP SELECT signal on a line 702 has an active low output during memory access to indicate that a memory access is in progress. It is used to enable RAM. A RAM READ signal on a line 704 has an active low outut during a memory read. The RAM READ signal is used to enable the memory to output data durng a memory read. A RAM write signal on a line 706 has an active low output during memory write and is used to strobe data into RAM.

Control input signals from the host system processor include a CNTRL signal on a line 708 having an active low indicating that certain other control input signals, to be discussed below, are directed at the interface itself rather than the memory being supported by the interface. The host processor can either write operation control information to the control register or completely reset the interface. If the CNTRL input is not active the processor control signals pass through the interface to memory.

A CHIP SELECT signal on a line 710 has an active low input for host system access of transparent memory or for a host system write operation to the Control and Error Logic 436. Processor READ and WRITE signals on lines 712,714 have an active low input in conjunction with the CHIP SELECT signal set for a host system read and write operations of transparent memory. The READ and WRITE signals are not used in DMA configurations. A MEMORY ACCESS CLOCK signal on a line 716 has an active low synchronizing output used to generate interface reads or writes to memory. In DMA mode, the MEMORY ACCESS CLOCK signal is more suitably called a DMA ACKNOWLEDGE. The host system uses the DMA REQUEST line to determine that the interface needs to access memory and indicates via the DMA ACKNOWLEDGE (MEMORY ACCESS CLOCK) to the control and error logic 436 that the memory is available for interface access. In transparent mode, the MEMORY ACCESS CLOCK signal indicates bus cycles and the interface uses it automatically to read or write memory if the host processor is not using memory as indicated by the CHIP SELECT signal.

The control and error logic 436 receives input signals on lines 718, 720, 722, 724, 726 from the input signal multiplexer 414 of FIG. 8. These signals are designated as line 456a in FIG. 8. Each of these input signals corresponds to the output signals from one or the other of the decoders 400, 402 depending on which set of output signals is selected by the input mux 414. I.e., the input signal on the line 718 corresponds to either the serial NRZ data on the line 500 or 504; the input signal on the line 720 corresponds to either the Command sync signal on the line 526 or 528; the input signal on the line 722 corresponds to either the encoder shift clock on the line 538 or 540; the input signal on the line 724 corresponds to either the take data signal on the line 534 or 536; and the input signal on the line 726 corresponds to either the valid word signal on the line 530 or 532.

The new command signal on the line 442 from the command recognition logic 412 of FIG. 8 is used for the purpose of initiating new activity as discussed above in connection with FIG. 8. A five bit mode code/subaddress output signal on the line 416 (see FIG. 8) contain the five least significant bits of the most recent command (the mode code), if the signal on the line 418 is low. They contain the subaddress otherwise. The signal on the line 418 originates in the mode detect and mode code/subaddress multiplexer 417 of FIG. 8 and is used to decode system dependent illegal commands.

A message error signal on the line 474 has an active high output identifying a message error bit that has been set due to reception of an illegal command or an error during the message sequence. The STATUS signal on the line 473 indicates to the subsystem if desired that a status word is about to be transmitted. A MODE signal on the line 468 has an active low output identifying that a mode command message transfer is in process by the interface. A XMIT (transmit command message) on the line 472 is an active low output identifying that a transmit command message transfer is in process by the interface. The host may want to know when a XMIT message has occurred so that it may update message buffers. A receive (RCV) signal on the line 470 has an active low output identifying a receive command message transfer is in process by the interface.

Figure 12B:
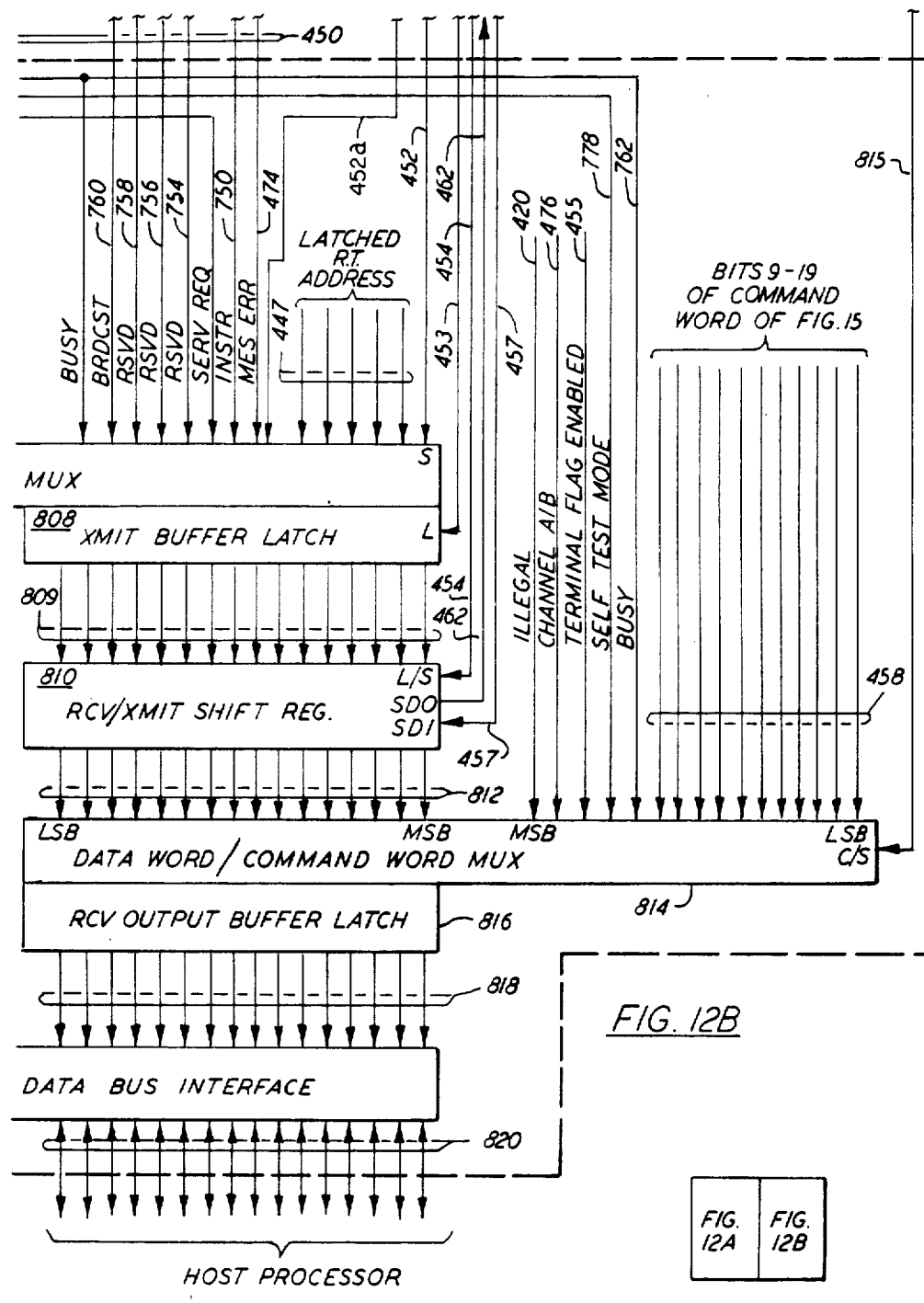
FIG. 12 is a more detailed simplified block diagram of the data transfer logic of FIG. 8.
Figure 12:
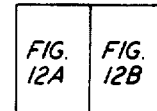
Figure 12A:
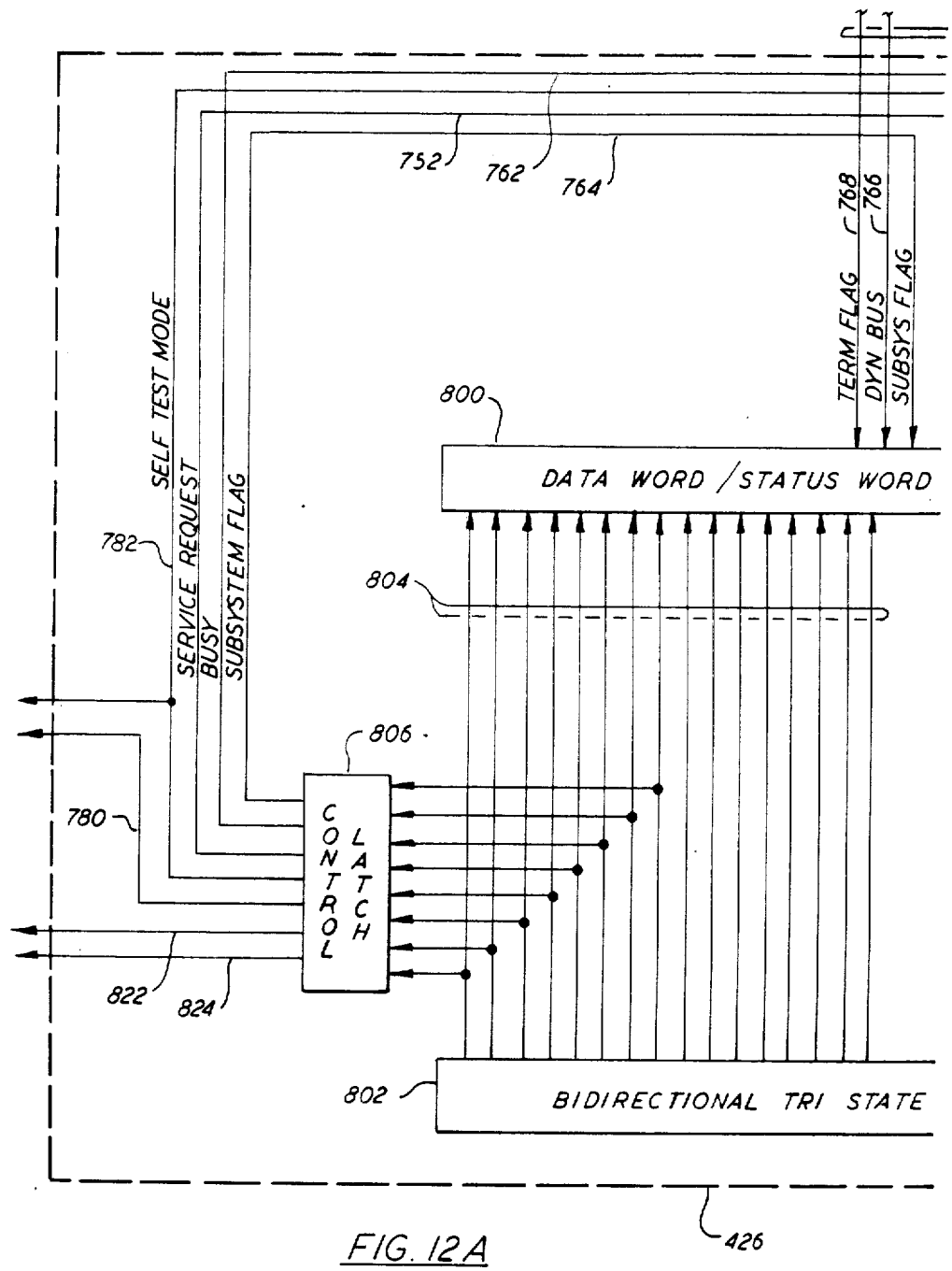

The control and error logic circuitry 436 provides part of the status word (all except the RT address, sync, and parity bit) to the Data Transfer Logic 426 (see FIG. 12). The bits provided by the control and error logic 436 are provided on the bundle of lines 450. These include a message error bit on the line 474, an instrumentation bit on a line 750, a service request bit on a line 752, three reserved bits on lines 754, 756, 758, a broadcast command receive bit on a line 760, a busy bit on a line 762, a subsystem flag bit on a line 764, a dynamic bus control acceptance bit on a line 766, and a terminal flag bit on a line 768.

The load/shift signal on the line 452 is transmitted to the data transfer logic 426 for loading data or status words for serial transmission to the encoder 464. The load signal on the line 453 is transmitted to the data transfer logic 426 for loading data or status words for buffering. A shift signal on a line 452a is sent to the data transfer logic 426 for initially selecting a status or data word. A signal on a line 776 is transmitted to the Manchester encoder 464 of FIG. 8 for enabling the encoder. The function of these signals will be discussed in more detail below in connection with FIG. 12.

A self-test signal on a line 782 is provided both to the control and error logic 436 and to the output multiplexing and self-test wrap-around logic 466. The control and error logic 436 uses this signal to initiate a status word transmit. It also causes the output multiplexing logic 466 to inhibit the normal Bi-phase outputs and enable wraparound inputs to the decoders.

A self-test channel select signal on a line 780 is similarly provided to both the control and error logic 436 and the output multiplexing and self-test wrap-around logic 466. The purpose of the self-test channel select signal is to select (via the wraparound logic) either Decoder A 400 or Decoder B 402 as recipient of the status word as encoded by the encoder 464. Due to the the simlarity of a status word and a command word the wrapped around status word is interpreted by the command recognition logic as a valid command causing, among other things, the pseudo "command" to be stored in host memory. By checking that memory location the host can verify proper operation of the interface to a very high degree.

Referring now to FIG. 12, a more detailed circuit block diagram of the Data Transfer Logic 426 of FIG. 8 is shown. A Data Word/Status Word Multiplexer 800 receives either a data word from a Bidirectional Tri-state Data Bus Interface 802 or a status word from the control and error logic 436 (see FIG. 8) and from the terminal address latch 524 of FIG. 9. A data word from the bidirectional tri-state data bus interface 802 is provided on the lines 804 to the data word/status word multiplexer 800. As may seen from FIG. 12, the data word on the lines 804 has 16 bits. The sync (3 bits) and parity (1 bit) bits shown in the data word 113 of FIG. 5 are not present but will be added later before transmission onto the 1553 bus by the encoder 464 of FIG. 8. The data word/status word multiplexer also receives 16 bit status word inputs on the lines 450 and 447. The five most significant bits, i.e., the RT address from the command recognition logic 412 of FIG. 9 and the remainder of the status, i.e., the terminal flag bit on the lines 768, the dynamic bus bit on the line 766, the subsystem flag bit on the line 764, the busy bit on the line 762, the broadcast bit on the line 760, the reserved bits on the lines 758, 756, 754, the service request bit on the line 752, the instrument bit on the line 750, and the message error bit on the line 474 are from either the control and error logic 436 of FIG. 8 or the control latch 806 of FIG. 12. The data word/status word multiplexer 800 selects either a data word or a status word in response to the presence of the select signal on the line 452a for selecting a data word or a status word to be loaded in response to the signal on line 452 for transmittal. The multiplexed data word/status word is transferred into a transmit (XMIT) buffer latch 808 upon receiving a load signal on a line 453 from the control and error logic 436 (see FIG. 8). The use of a buffer latch 808 in this manner permits the data word/status word multiplexer 800 to receive another word even through the previous word cannot yet be transmitted further at that time.

Upon reception of a load/shift signal on a line 454 the data word/status word is transmitted on the lines 809 to a receive/transmit (RCV/XMIT) shift register 810 where the data word/status word in parallel form is transmitted out in serial form from a serial data out (SDO) port on the line 462 to the encoder 464 (see FIG. 8).

The receive/transmit shift register 810 may also receive serial data at a serial data input port (SDI) on a line 457 from the input signal multiplexer 414 (see FIG. 8). The receive/transmit shift register shifts in each serial bit until a complete data word (excluding the sync and parity bits) is assembled. At that time the data word may be transferred on the lines 812 to a data word/command word multiplexer 814. The data word/command word multiplexer 814 is also capable of receving a modified command word on the lines 420, 476, 455, 782, 762, 458. A command store signal on a line 815 from the Control and Error Logic 436 determines whether a data or command word is received. After determining whether a data word or command word is present the multiplexer 814 loads in and transfers the applicable word to a receive (RCV) output buffer latch 816. The buffer latch 816 permits the data word/command word multiplexer 814 to receive an immediately succeeding word even though the previously received word may not be transmittable at that time. Thus, the buffer latch serves as a temporary storage register which holds a word for a brief period of time for subsequent transmission on lines 818 to the bidirectional tri-state data bus interface 802.

The bidirectional tri-state data bus interface 802 is capable of receiving data words as defined in FIG. 5 (excluding sync bits 1-3 and parity bit 20 on lines 820) from the host for transmittal in serial form on the 1553 bus or is capable of transmitting either a data word from the 1553 bus or a "command word" from the data word/command word multiplexer 814 to the host processor.

The triggering mechanism for transmitting data or "command" words to the host processor is the RCV Output Buffer Latch 816 becoming full. The control logic 436 issues a DMA request as a result of the RCV buffer 816 being loaded with either "command" or data information. The control logic will then wait for a MEMORY ACCESS CLOCK (DMA ACKNOWLEDGE) signal on the line 716 in conjunction with CHIP SELECT inactive as an indication from the Host that memory should now be accessed (see FIG. 11). The control logic then generates RAM WRITE and RAM CHIP SELECT signals on the lines 706 and 702, respectively, and enables bus drivers within the Bidirectional Tri-State Data Bus Interface 802. The Host system uses the RAM WRITE and RAM CHIP SELECT signals to cause the information presented by the bus drivers to be loaded into RAM at the location specified by the address lines 428 (see FIGS. 8 and 10).

The triggering mechanism for fetching (reading) data is the XMIT buffer 808 becoming empty after a transmit message signal on the line 472 (see FIGS. 8 and 11) is sent from the control logic to the host. Again, a DMA request is issued and a similar sequence occurs with the exception that a RAM READ signal on the line 704 (see FIG. 11) is generated instead of RAM WRITE; also, the bus is used to receive information rather than present it.

The control latch 806 in addition to providing some of the bits for the status words, also provides the self test signal on the line 780, the self-test channel select signal on the line 782, and master enable signals on the lines 822, 824 which permit the host to disable either or both of the channels A and B.

Although the invention has been shown and described with respect to detailed embodiments thereof, it should be understod by those skilled in the art that various changes in form and detail thereof may be made without departing from the spirit and the scope of the claimed invention.

I claim:

1. A bus interface circuit for transferring digital signals formatted as command, data, and status words between a signal processor having an associated memory and one of two redundant serial data buses, comprising:
control means responsive to both serial data buses for identifying and selecting one of the buses for transferring words between the memory and the identified and selected serial data bus according to the last bus to provide a valid command word;
data transfer means responsive to words from the selected serial data bus and the signal processor for transferring data, status and command words at a data port of the bus interface circuit between the identified and selected bus and the memory; and
addresing means, responsive to command words for addressing memory at an address port of the bus interface circuit, said addressing means also responsive to addressing signals from the signal processor for addressing the memory, whereby the signal processor is always granted access to the memory and whereby the interface circuit addresses the memory only when the signal processor is busy on tasks other than accessing the memory.

2. The interface circuit of claim 1, wherein said data transfer means further comprises:
state machine and control means for interpreting commands and controlling data transfer to and from memory, for checking for errors, and for providing status words and control signals;
receive/transmit shift register means, responsive to said control signals and to data and status words in serial form from one of the buses, for transmittal in parallel form to the memory and responsive to data words in parallel form from the memory for transmittal in serial form to one of the redundant buses, and responsive to status words in parallel form from said state machine and control means for transmittal in serial form to one of the redundant buses;
data word/status word multiplexer means, responsive to data words in parallel form from the memory, and responsive to status words in parallel form from said state machine and control means, for selecting between said data words and said status words for transmission to said receive/transmit shift register means; and
data word/command word multiplexer means, responsive to incoming serial data words assembled in parallel from from said receive/transmit shift register means and responsive to command words from the redundant buses, for selecting between data words and command words for transmission to the memory.

3. The interface circuit of claim 2, further comprising:
transmit buffer latch means, responsive to data words and status words in parallel form from said data word/status word multiplexer means, for storing a word temporarily before transmittal of said word to said receive/transmit shift register; and
receive output buffer latch means, responsive to data words and command words in parallel form from said data word/command word multiplexer means, for storing a word temporarily before transmittal of said word to the memory.

4. The interface circuit of claim 1 wherein said control means and said addressing means together comprise:

first decoder means, responsive to words from a fist one of serial data buses for decoding words therefrom, for verifying proper word format, for providing a valid word signal and for providing decoded words;
second decoder means, responsive to words from a second one of the serial data buses for decoding words therefrom, for verifying proper word format, for providing valid word signals and for providing decoded words;
first shift register means, responsive at an input thereof to command words in serial form from said first decoder means for providing command words in parallel form at an output thereof;
second shift register means, responsive at an input thereof to command words in serial form from said second decoder means for providing command words in parallel form at an output thereof;
command detect means, responsive to said valid word signals and to command words from said first and second shift register means for determining which bus issued the last valid command word, and for providing a bus signal for identifiying the bus from which the last valid command was received;
input word multiplexer means, responsive to said bus signal and responsive to data words and status words in serial form from said first and second buses for accepting data words and status words from the bus from which the last valid command was received and for providing said accepted data words and said accepted status words in serial form at an output thereof for transfer to said data port;
command multiplexer means, responsive to command words in parallel form from said first shift register means and said second shift register means and responsive to said bus signal for providing the last valid command word from the bus from which the new command was received; and
output multiplexer means, responsive to words from the signal processor and to said bus signal, for providing said words to one of the redundant serial data buses according to said bus signal.

5. The interface circuit of claim 1, further comprising address multiplexer means, responsive to command words from the redundant buses and responsive to address words from the signal processor, for providing address words from the signal processor at said address port in response to a chip enable signal from the signal processor and for providing command words or translated command words otherwise.

6. The interface circuit of claim 1, for use in a selectable DMA mode, wherein the addressing means is responsive only to command signals from the serial buses for providing a memory access request signal to the signal processor, whereby the addressing means only addresses the memory in response to a DMA acknowledge signal from the signal processor.

7. A bus interface circuit for transferrng digital signals formatted as command, data and status words between a signal processor, having an associated memory, and one of two redundant serial data buses, comprising:
decoder means, responsive to the command, data and status words provided by the two redundant serial data buses in biphase code, for determining the format validity of each received word and providing each word in serial NRZ format and for providing a format validity signal indicative of the format validity and source bus of each word;

command word processing means, responsive to command words in said serial NRZ format and responsive to said format validity signal for determining the command word validity of said command words, for providing a command word validity signal indicative of command word validity and the source bus of each command word and for providing said command words assembled in parallel form as addresses at an address port of said bus interface circuit and for providing addresses at said address port for the data words provided subsequent to each command word by decrementing (or incrementing) each command according to the word count of the command word until each data word has been addressed;

status/data/command word processing means, responsive to said data and status words in said serial NRZ format and responsive to said command words assembled in parallel form from said command processing means, for providing said data, status and command words, output in parallel form, at a data port of said bus interface circuit for storage in the memory at an address provided at said address port, said data/command word processing means also responsive to command and data words in parallel form input at said data port and responsive to status words assembled in parallel form for providing said input and assembled words in serial NRZ format; and encoder means, responsive to said input and assembled words for encodement to biphase code format and responsive to said command word validity signal for providing said biphase coded input and assembled words to the last serial data bus to provide a valid command word.

8. The circuit of claim 7, further comprising output multiplexer means, responsive to said biphase coded input and assembled words for routing to one of the serial buses, and responsive, in lieu of said encoder, to said command word validity signal for selecting one of the serial buses to receive said biphase coded input and assembled words, and responsive to the command, data and status words provided by the two redundant serial data buses in biphase code for routing said biphase coded words into said decoder means.

9. The circuit of claim 7, wherein said output multiplexer means is responsive to a self-test signal for inhibiting transfer of biphase coded signals to either serial data bus and for providing a preselected biphase coded status word provided by said status/data/command word processing means, also in response to said self-test signal, to said decoder means for processing as if it were a command word for storage in the memory at an address provided by said command word processing means, as if it were a command word.

10. The circuit of claim 7, wherein said command word processing means is also responsive to address signals from the signal processor for providing said address signals at said address port, wherein said command words and also decremented (or incremented) command words are provided at said address port only in the presence of a determination that the signal processor is busy on other than memory access tasks.

* * * * *